(12) United States Patent
Yeaglin

(10) Patent No.: US 8,584,295 B1
(45) Date of Patent: Nov. 19, 2013

(54) ROLLABLE SNOW AND ICE REMOVER FOR VEHICLE ROOFS

(75) Inventor: William E. Yeaglin, Mount Joy, PA (US)

(73) Assignee: Quintin Machinery LLC, Lancaster, PA (US)

( * ) Notice: Subject to any disclaimer, the term of this patent is extended or adjusted under 35 U.S.C. 154(b) by 350 days.

(21) Appl. No.: 12/807,048

(22) Filed: Aug. 26, 2010

(51) Int. Cl.
    *B60S 3/04* (2006.01)
(52) U.S. Cl.
    USPC ................. 15/97.3; 15/53.1; 15/53.3
(58) Field of Classification Search
    USPC ......... 15/3, 53.1, 53.3, 97.1, DIG. 2; 134/123
    See application file for complete search history.

(56) References Cited

U.S. PATENT DOCUMENTS

| | | | | | |
|---|---|---|---|---|---|
| 2,708,446 | A | * | 5/1955 | Phillips | 134/93 |
| 3,072,131 | A | * | 1/1963 | Di Laurenzio | 134/123 |
| 3,459,203 | A | * | 8/1969 | Pritchard | 134/123 |
| 5,076,304 | A | * | 12/1991 | Mathews | 134/57 R |
| 5,160,430 | A | * | 11/1992 | Gasser et al. | 210/138 |
| 5,802,654 | A | * | 9/1998 | Yeaglin | 15/97.3 |
| 5,989,356 | A | | 11/1999 | Candeletti | |
| 6,453,500 | B1 | | 9/2002 | Schmitt | |
| 6,654,978 | B2 | | 12/2003 | Bouchard | |
| 7,617,561 | B2 | * | 11/2009 | Couture | 15/306.1 |
| 2009/0199880 | A1 | * | 8/2009 | Wentworth et al. | 134/123 |
| 2009/0217944 | A1 | * | 9/2009 | Munera et al. | 134/6 |
| 2009/0282630 | A1 | * | 11/2009 | Reed | 15/97.3 |
| 2009/0282708 | A1 | | 11/2009 | Reed | |

* cited by examiner

*Primary Examiner* — Monica Carter
*Assistant Examiner* — Michael Jennings
(74) *Attorney, Agent, or Firm* — Barley Snyder

(57) ABSTRACT

The invention is a snow and ice remover for the roofs of trucks and trailers that is rollable along the ground. Two vertical beams and an upper cross piece support a vertically adjustable snow plow assembly, so that when a snow or ice covered truck or trailer moves under the properly positioned plow, the snow or ice is pushed off the top of the vehicle. The entire structure is supported by two horizontal base structures at ground level. The base structures each have wheels on jacks at their ends to permit lifting and rolling the unit. Each base structure also has a platform to hold a ballast weight to prevent movement of the unit when it is lowered to the ground and in use.

43 Claims, 1 Drawing Sheet

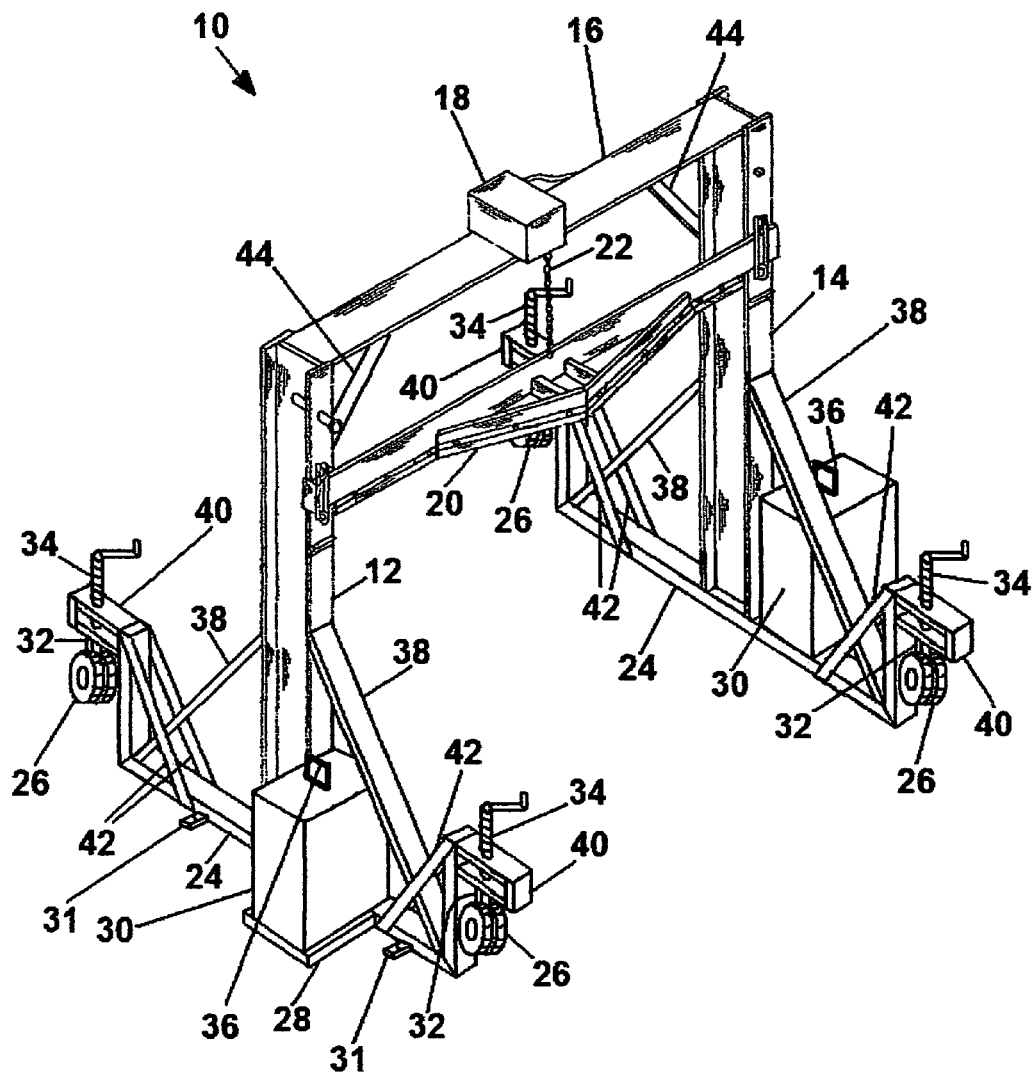

ROLLABLE SNOW AND ICE REMOVER FOR VEHICLE ROOFS

BACKGROUND OF THE INVENTION

This invention deals generally with brushing and cleaning and more specifically with cleaning snow and ice from the roofs of vehicles.

It is not an uncommon experience in localities which experience significant snowfall to see a slab of snow fly off the roof of a passenger car or van and strike a following vehicle. Regardless of the vehicle from which the snow is released, the experience is startling to the driver behind. However, if the snow is from atop a large semi-trailer, and particularly if it has been hardened into ice, the event can be very dangerous.

This has always been a concern of the trucking industry. Therefore, trucking companies spend considerable money to clear snow and ice from the roofs of trailers after every major snow storm. This effort not only takes money but also requires significant time, so that the operation of the trucks of a large fleet can be delayed significantly after a snowstorm. Furthermore, since the snow and ice removal has generally been done manually by workers shoveling from atop the trailers, employers and insurance companies are very concerned about the danger of such workers slipping and falling from the typically 13 foot high trailer roofs. Furthermore, at least one state, New Jersey, requires that such roof snow and ice be cleared before a truck moves onto a public road, but even without such requirements, there is a significant increase in fuel consumption, and therefore an increase in the cost of operation, if snow or ice is not removed.

Several devices exist to attack this problem. U.S. Pat. No. 5,802,654 by Yeaglin, the inventor of the present application, discloses an immovable bridge like structure supporting a vertically adjustable wedge shaped snow plow that vehicles can move under to have snow or ice removed. U.S. Pat. No. 5,989,356 by Candeletti uses a snow removal scraper supported on a pillar installed on cement footings.

One of the problems with such structures is that they are very large in both width and height, and therefore occupy significant space, particularly considering that they must have significant free space around them to permit maneuvering semi-trailers into and through them. This problem is aggravated because the height of these structures requires particular care to assure their stability, and the situation is particularly bothersome to users who do not need a snow scraper throughout a large portion of any year.

Published Patent Application US2009/0282708 by Reed attempts to overcome this problem by supplying a structure that is not imbedded in the ground, but instead is held down by four removable concrete blocks which rest on two base plates attached at the bottom of the vertical supports of the bridge like structure. The snow scraper structure can then be moved to a storage location when not in use. This is accomplished by using two forklifts vehicles with 5000 pound capacity. The forklifts first lift each of the 3 ton concrete blocks off the base plate. Then, by inserting their forks into pockets within the two base plates at the bottom of opposite sides of the bridge structure the two forklifts work in tandem to move the structure. This is no easy task since the structure weights 8,800 pounds, is over 16 feet tall, and is approximately 17 feet wide.

Since it is clear that a movable snow scraper structure has the distinct benefit of being movable out of the way when not in use, it would be very beneficial to have such a movable snow scraper available, particularly for small businesses, that does not require the use of two heavy duty forklifts and two specially skilled operators who can operate in tandem on opposite sides of a wide, tall, and heavy structure such as the typical snow scraper.

SUMMARY OF THE INVENTION

The present invention fulfills that need by furnishing a tall snow scraper that has retractable wheels and can be rolled using a pickup truck, car, tractor or two or three people on foot.

The preferred embodiment of the invention includes the basic structure of U.S. Pat. No. 5,802,654 by Yeaglin, which is incorporated herein by reference. Both the prior patent and the present invention are bridge like snow and ice removers as previously discussed, and have dimensions between the vertical supports that permit a semi-trailer to move through the structure.

The difference between the structure in the Yeaglin U.S. Pat. No. 5,802,654 and the present invention is that the prior patent has its vertical support beams anchored in the ground with appropriate footers while the present invention has the vertical support beams stably supported by base structures that include retractable wheels. When the wheels are retracted the base structures sit on the ground, and, in fact, since the lowered wheels also are on the ground as the unit is lifted, the structure is never out of contact with the ground.

The wheels are mounted on casters that are located at the ends of the base support structures, so that movement of the snow and ice remover is possible in all directions. Furthermore, the vertical support beams and the support structures for the casters are each stabilized by angle supports so that the unit will not distort or tip either when it is functioning to remove snow or when it is being moved.

To prevent movement when the unit is in use clearing snow, the base structures also include platforms, one on each side of the vehicle pass through area, and when the unit is to be in use, concrete ballasts are placed on the two platforms.

The present invention thereby has all of the attributes of the prior art vehicle roof snow removers with the added benefit of being safely and easily moveable to permit storage when it is not in use.

BRIEF DESCRIPTION OF THE DRAWING

The FIGURE is a perspective view of the preferred embodiment of the invention.

DETAILED DESCRIPTION OF THE INVENTION

The FIGURE is a perspective view of the preferred embodiment of the invention that includes the basic structure of U.S. Pat. No. 5,802,654 by Yeaglin, which is incorporated herein by reference. Snow and ice remover 10 is constructed with vertical support "I" beams 12 and 14 and upper cross piece 16 forming an overhead bridge structure. In the preferred embodiment, vertical support beams 12 and 14 extend approximately twenty feet above ground. They are also separated by a distance sufficient to easily move a typical semi-trailer between them. The function of upper cross piece 16 is to support winch 18, from which snow plow assembly 20 is supported by chain 22. An operator at ground level can operate winch 18 to raise or lower snow plow assembly 20 to clear snow and ice from vehicles of different heights.

The present invention departs dramatically from the structure of the Yeaglin patent and other such snow and ice removers by no longer embedding beams 12 and 14 in the ground, but instead stably supporting snow and ice remover 10 on base structures 24 which include retractable wheels 26. Base structures 24 also each include a platform 28 so that when wheels 26 are retracted, as shown in the FIGURE, base structures 24 sit on the support surface. When snow and ice remover 10 is in use clearing snow, ballasts 30, typically made of concrete, are placed on platforms 28 to prevent movement of snow and ice remover 10 as a vehicle moves through it for snow and ice clearing. Additional means to prevent such movement of the structure are plates 31 which are attached to base structures 24 and include holes through which locking devices such as stakes or other devices can be inserted into the support surface.

The four sets of dual wheels 26 are mounted on pneumatic swivel casters 32 that are held at the ends of base structures 24 by jack supports 40. Therefore, once the wheels are lowered and lift the structure, snow and ice remover 10 can be moved in any direction. Wheels 26 and casters 32 are mounted on trailer type wheel jacks 34, and each jack 34 is rated for 5,000 pound lifting capacity.

When snow and ice remover 10 is to be moved, ballasts 30 are removed from platforms 28 using lifting hooks 36 or some other lifting structure. The removal of the ballasts can easily be accomplished by a small fork lift. Then wheels 26 are lowered using wheel jacks 34, thereby raising snow and ice remover 10 so that base structures 24 are typically about 2 inches off the ground. In the preferred embodiment, ballasts 30 each weigh 2,000 pounds, and when the ballasts are removed, snow and ice remover 10 weighs 2,700 pounds.

Vertical support beams 12 and 14 are attached to base structures 24, and stabilizing supports 38 prevent motion between them. Stabilizers 44 are also attached between upper cross piece 16 and vertical support beams 12 and 14 to prevent distortion of the structure. Similarly, jack stabilizers 42, which are attached between jack supports 40 and base structures 24, stabilize jacks 34, casters 32, and wheels 26. Therefore, snow and ice remover 10 will not distort or tip either when it is functioning to remove snow and ice or when it is being moved. This stability holds even when the unit is in service upon or being moved on a rough stone surface.

The present invention thereby has all of the qualities of other vehicle roof snow removers with the added benefit of being easily and safely moveable to permit storage when it is not in use.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, devices other than "I" beams can be used for vertical support structures 12 and 14, and various devices and materials can be used for base structures 24 and stabilizers 38, 42 and 44.

What is claimed as new and for which Letters Patent of the United States are desired to be secured is:

1. A snow and ice remover for vehicle roofs comprising:
    a pair of vertical supports positioned apart from each other;
    a snow plow attached to the vertical supports at a location and a height which permits a vehicle to be moving under the snow plow;
    a base structure attached to and supporting each of the pair of vertical supports and having a pair of wheels engaging a support surface upon which the snow and ice remover stands; and
    a lifting device connecting each of the pair of wheels to the base structure and raising the pair of wheels off the support surface.

2. The snow and ice remover of claim 1, wherein the wheels are mounted on casters.

3. The snow and ice remover of claim 1, wherein the lifting devices are jacks.

4. The snow and ice remover of claim 1, further comprising at least one ballast located on the base structure.

5. The snow and ice remover of claim 1, further comprising stabilizers attached to the vertical supports and to the base structure.

6. The snow and ice remover of claim 1, further including stabilizers attached to the support surface and to the base structure.

7. The snow and ice remover of claim 1, further including an upper cross piece connecting the vertical supports.

8. The snow and ice remover of claim 7, further including an upper cross piece connecting the vertical supports and stabilizers attached to the vertical supports and to the upper cross piece.

9. The snow and ice remover of claim 1, further comprising a plate attached to the base structure, the plate having a hole.

10. A snow and ice remover for vehicle roofs comprising:
    a pair of vertical supports positioned apart from each other;
    a snow plow extending between and moveable along the pair of vertical supports;
    a base structure attached to and supporting each of the pair of vertical supports
    a pair of wheels disposed on the base structure and engaging a support surface upon which the snow and ice remover stands;
    a jack attached to each of the pair of wheels; and
    a ballast positionable on the snow and ice remover.

11. The snow and ice remover of claim 10, wherein the wheels are mounted on casters.

12. The snow and ice remover of claim 10, wherein the ballast is located on the base structure.

13. The snow and ice remover of claim 10, further comprising stabilizers attached to the vertical supports and to the base structure.

14. The snow and ice remover of claim 10, further including stabilizers attached to the support surface and to the base structure.

15. The snow and ice remover of claim 10, further including an upper cross piece connecting the vertical supports.

16. The snow and ice remover of claim 15, further including an upper cross piece connecting the vertical supports and stabilizers attached to the vertical supports and to the upper cross piece.

17. The snow and ice remover of claim 10, further comprising a plate attached to the base structure, the plate having a hole.

18. A snow and ice remover for vehicle roofs comprising:
    a pair of vertical supports positioned apart from each other;
    a plow attached to the pair of vertical supports;
    a base structure attached to and supporting each of the pair of vertical supports;
    a plurality of wheels connected to the base structure and engaging a support surface upon which the snow and ice remover stands and having
    a disengaging mechanism attached to the plurality of wheels;
    a plate connected to the base structure; and
    a securing device engagable with the plate and the support surface.

19. The snow and ice remover of claim 18, wherein the wheels are mounted on casters.

20. The snow and ice remover of claim 18, wherein the disengaging mechanism is a jack.

21. The snow and ice remover of claim 18, further comprising a ballast located on the base structure.

22. The snow and ice remover of claim 18, further comprising stabilizers attached to the vertical supports and to the base structure.

23. The snow and ice remover of claim 18, further including stabilizers attached to the support surface and to the base structure.

24. The snow and ice remover of claim 18, further including an upper cross piece connecting the vertical supports.

25. The snow and ice remover of claim 24, further including an upper cross piece connecting the vertical supports and stabilizers attached to the vertical supports and to the upper cross piece.

26. A snow and ice remover for vehicle roofs comprising:
two vertical supports separated by a distance sufficient to move a vehicle between the vertical supports;
a snow plow attached to the vertical supports at a location and a height which permits a vehicle to be moving under the snow plow while snow and ice on the roof of the vehicle are pushed off of the vehicle;
a base structure attached to and supporting the vertical supports, with the base structure including wheels engaging a support surface upon which the snow and ice remover stands;
means to prevent the wheels from moving, wherein the means to prevent the wheels from moving are jacks that raise the wheels off the support surface and lower the snow and ice remover onto the support surface; and
means to prevent the snow and ice remover from moving when a vehicle is moving under the snowplow.

27. The snow and ice remover of claim 26, wherein the wheels are mounted on casters.

28. The snow and ice remover of claim 26, wherein an additional means to prevent the snow and ice remover from moving when a vehicle is moving under the snowplow is at least one ballast located on the snow and ice remover.

29. The snow and ice remover of claim 26, wherein the means to prevent the snow and ice remover from moving when a vehicle is moving under the snowplow is at least one ballast located on each base structure.

30. The snow and ice remover of claim 26, further including stabilizers attached to the vertical supports and to the base structures and preventing motion between the vertical supports and the base structures.

31. The snow and ice remover of claim 26, further including stabilizers attached to support structures for the wheels and to the base structures and preventing motion between the wheels and the base structures.

32. The snow and ice remover of claim 26, further including an upper cross piece connecting the vertical supports.

33. The snow and ice remover of claim 26, further including an upper cross piece connecting the vertical supports and stabilizers attached to the, vertical supports and to the upper cross piece and preventing motion between the vertical supports and the upper cross piece.

34. The snow and ice remover of claim 26, wherein the means to prevent the snow and ice remover from moving when a vehicle is moving under the snowplow are plates attached to the base structures, and the plates include holes through which locking devices such as stakes and other devices can be inserted into the support surface.

35. The snow and ice remover of claim 34, wherein the means to prevent the snow and ice remover from moving when a vehicle is moving under the snowplow are plates attached to the base structures, and the plates include holes through which locking devices such as stakes and other devices can be inserted into the support surface.

36. A snow and ice remover for vehicle roofs comprising:
two vertical supports separated by a distance sufficient to move a vehicle between the vertical supports;
a snow plow attached to the vertical supports at a location and a height which permits a vehicle to be moving under the snow plow while snow and ice on the roof of the vehicle are pushed off of the vehicle;
a base structure attached to and supporting the vertical supports, with the base structure including wheels engaging a support surface upon which the snow and ice remover stands;
means to prevent the wheels from moving; and
means to prevent the snow and ice remover from moving when a vehicle is moving under the snowplow, wherein the means to prevent the snow and ice remover from moving when a vehicle is moving under the snowplow is at least one ballast located on the snow and ice remover.

37. The snow and ice remover of claim 36, wherein the wheels are mounted on casters.

38. The snow and ice remover of claim 36, wherein the means to prevent the wheels from moving are jacks that raise the wheels off the support surface and lower the snow and ice remover onto the support surface.

39. The snow and ice remover of claim 36, wherein the means to prevent the snow and ice remover from moving when a vehicle is moving under the snowplow is at least one ballast located on each base structure.

40. The snow and ice remover of claim 36, further including stabilizers attached to the vertical supports and to the base structures and preventing motion between the vertical supports and the base structures.

41. The snow and ice remover of claim 36, further including stabilizers attached to support structures for the wheels and to the base structures and preventing motion between the wheels and the base structures.

42. The snow and ice remover of claim 36, further including an upper cross piece connecting the vertical supports.

43. The snow and ice remover of claim 42, further including an upper cross piece connecting the vertical supports and stabilizers attached to the, vertical supports and to the upper cross piece and preventing motion between the vertical supports and the upper cross piece.

* * * * *